Patented Aug. 10, 1948

2,446,615

UNITED STATES PATENT OFFICE 2,446,615

N-SUBSTITUTED PANTOYL AMIDES

William Shive, Austin, Tex., and Esmond Emerson Snell, Madison, Wis., assignors to Research Corporation, New York, N. Y., a corporation of New York No Drawing. Application May 25, 1946, Serial No. 672,338

2 Claims. (Cl. 260—561)

This invention relates to new compounds which are useful as bacterial growth inhibitors or as anti-vitamins for pantothenic acid.

The new compounds are pantoylalkylamines and related compounds which may be represented by the following formula

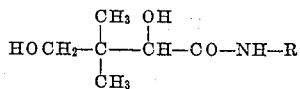

in which R represents an alkyl group containing from 3 to 7 carbon atoms.

The new compounds may be made by the reaction or condensation of alpha, gamma-dihydroxy-beta, beta-dimethyl-butyrolactone or a suitable derivative thereof with an amine having the formula RNH₂, where R represents the groupings indicated above.

The amines which can thus be used for reaction or condensation with alpha, gamma-dihydroxy-beta, beta-dimethyl-butyrolactone include alkylamines such as propylamine, isopropylamine, n-butylamine, isobutylamine, sec-butylamine, n-amylamine, isoamylamine, n-heptylamine, etc.

The new products can be considered N-pantoylalkylamines.

The active form of the above compounds is that prepared from (−)-alpha, gamma-dihydroxy-beta, beta-dimethyl-butyrolactone. The racemic lactone forms racemic derivatives with only approximately half the activity (inhibitory properties) of that prepared from the (−) lactone. The methods of preparation may be the same except for purification. The derivatives prepared from the (−) lactone are in general readily purified by vacuum distillation when their melting points are too low for satisfactory recrystallization.

In referring to the new compounds as pantoylalkylamines, etc., the term "pantoyl" is used for the alpha, gamma-dihydroxy-beta, beta-dimethylbutyryl radical

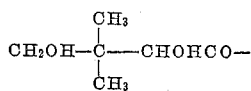

In making the new dl-N-pantoylalkylamines, etc., the dl-pantolacetone or dl-alpha, gamma-dihydroxy-beta, beta-dimethylbutyrolactone is advantageously used with an excess of the calculated quantity of alkylamine, e. g., around 10% excess. The reaction mixture becomes somewhat warm and is then heated with occasional stirring, e. g., at 100 to 110° C. for two hours at atmospheric pressure and for an additional period, e. g., of two hours under reduced pressure to remove the unchanged reactants. The products can in some cases be separated by crystallization on standing and further purified by recrystallization.

The invention will be further illustrated by the following specific examples, but it will be understood that the invention is not limited thereto. The parts are by weight.

*Example I.—dl - N-pantoyl-n-propylamine.—* On addition of 0.72 part of n-propylamine to 1.31 parts of dl-alpha, gamma-dihydroxy-beta, beta-dimethylbutyrolactone, the mixture became warm. It was heated with occasional stirring for two hours at 110° C. and the reaction mixture was then heated for two hours under reduced pressure to remove unchanged propylamine. The viscous product showed little tendency to crystallize but a small sample crystallized from petroleum ether-benzene after standing overnight at a low temperature. The remaining product was then crystallized from ether after first being seeded with a small amount of crystalline material. Recrystallization from ether gave colorless octahedral prisms of melting point 45–47° C.

*Example II.—dl-N-pantoylisoamylamine.—*To 1.3 parts of dl-pantolactone an excess of 10% over the calculated quantity of isoamylamine was added and the reaction mixture was heated with occasional stirring at 100–110° C. for about two hours at atmospheric pressure and for an additional two hours under reduced pressure to remove unchanged reactants. On standing overnight the dl-N-pantoylisoamylamine crystallized and was recrystallized from ether containing a small amount of absolute alcohol. The product had a melting point of 76.0–78.0° C.

*Example III.—dl - N - pantoylisobutylamine.—* This was prepared in accordance with the procedure set forth in Example IV but crystallization from the reaction mixture was effected by dissolving in ether and allowing to stand in a refrigerator overnight and by recrystallizing the dl-N-pantoylisobutylamine from ether. The crystalline product had a melting point of 65.0–67.0° C.

*Example IV.—dl - N - pantoylisopropylamine.—* This was prepared in accordance with the procedure of the preceding example and the crystalline product had a melting point of 50.5–52.5° C.

*Example V. — dl-N-pantoyl-sec-butylamine.—* dl-pantolactone was reacted with sec-butylamine in accordance with the procedure set forth in Example IV. Small amounts of the resulting viscous oily material were treated by the addition of petroleum ether and allowed to stand for several days in a refrigerator to form crystals which when added to an ether solution of the viscous oily material resulted in crystallization of the dl-N-pantoyl-sec-butylamine which was recrystallized from ether-petroleum ether to give a product having a melting point of 53.0–56.0° C.

In a similar manner the dl-N-pantoyl-n-butylamine was produced of melting point of 51.6–53.4° C. and the dl-N-pantoyl-n-amylamine of melting point 43.5–45.0° C.

When n-heptylamine was reacted with dl-pantolactone the resulting product did not crystallize by the methods above referred to and was subsequently distilled under a pressure of $10^{-6}$ mm. with an outside bath temperature of 123–128°, leaving in this case a liquid product.

The new compounds above described showed inhibition of growth of several organisms which require pantothenic acid.

The growth inhibiting property of the products varies with different organisms and with different individual products. In the case of the pantoyl-alkylamines the compounds containing a normal alkyl group were more active than the isomeric products containing a branched alkyl group against certain organisms. With certain organisms the effectiveness of the pantoylalkylamines increased as the length of the alkyl group increased up to 4 carbon atoms and then slowly decreased but with other organisms no definite trend in effectiveness with increasing chain length was apparent. The pantoylalkylamines made with normal alkylamines containing from 3 to 7 carbon atoms appear to be particularly valuable, e. g., the pantoyl-n-butyl-, n-amyl- and n-heptylamine compounds.

The various compounds vary markedly in inhibitory properties for a single organism; and the relative potencies of members of a series of compounds differ markedly for different organisms. But in general all of these compounds inhibit growth of various organisms which require pantothenic acid for their growth, acting as growth inhibitors or anti-vitamins for pantothenic acid.

We claim:

1. New growth inhibiting amides, represented by the following formula:

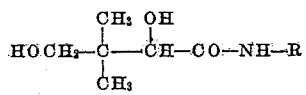

in which R represents an alkyl group containing from 3 to 7 carbon atoms.

2. New growth inhibiting amides, represented by the following formula:

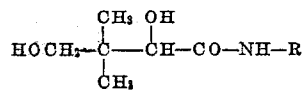

in which R is a normal alkyl group containing from 3 to 7 carbon atoms.

WILLIAM SHIVE.
ESMOND EMERSON SNELL.

REFERENCES CITED

The following references are of record in the file of this patent:

UNITED STATES PATENTS

| Number | Name | Date |
| --- | --- | --- |
| 2,348,425 | Snell | May 9, 1944 |
| 2,358,337 | Lawson et al. | Sept. 19, 1944 |
| 2,369,839 | Moore | Feb. 20, 1945 |
| 2,372,654 | Bergel et al. | Apr. 3, 1945 |
| 2,377,105 | Reichstein | May 29, 1945 |
| 2,377,814 | Schnider | June 5, 1945 |

OTHER REFERENCES

Barnett, "Chemical Abstracts," vol. 38 (1944), page 2010. Abstract of "Jour. Chem. Soc.," 1944, pages 5 to 8.

Snell et al., "J. Biol. Chem.," vol. 158, May 16, 1945, pages 551 to 559.